Feb. 9, 1954   D. W. BLOSER   2,668,925
ELECTRIC MACHINE CONSTRUCTION
Filed April 5, 1949   2 Sheets-Sheet 1

INVENTOR
DWIGHT W. BLOSER

David O. Woody
ATTORNEY

Feb. 9, 1954          D. W. BLOSER          2,668,925
ELECTRIC MACHINE CONSTRUCTION
Filed April 5, 1949                           2 Sheets-Sheet 2

INVENTOR
DWIGHT. W. BLOSER
ATTORNEY

Patented Feb. 9, 1954

2,668,925

UNITED STATES PATENT OFFICE 2,668,925

ELECTRIC MACHINE CONSTRUCTION

Dwight W. Bloser, West Englewood, N. J., assignor to Kearfott Company, Inc., New York, N. Y., a corporation of New York Application April 5, 1949, Serial No. 85,645

3 Claims. (Cl. 310—258)

1

The present invention relates to electric machines such as motors, generators, and synchro units, and more particularly to the high quality small machine field.

Small machines of high performance characteristics are used extensively in servo systems, in environments seriously limiting their weight and dimensions, yet demanding relatively high rotor torque.

It is well known that the torque of a dynamoelectric machine varies inversely with the square of the air gap length and directly with the axial width of the air gap. The width of the air gap is limited by the permissible over-all machine length. Heretofore practical minimizing of the air gap length has been limited in manufacture by the dimensional tolerances required for the components, from the rotor shaft radially out to the inside of the housing. These tolerances being cumulative have placed a practical limitation on the minimum length of air gap, since the air gap length must be sufficient to allow for the dimensional variations of rotors and stators within manufacturing tolerances so as to prevent contact between stator and rotor during use.

It is an object of the present invention to provide a novel construction that obviates the need to observe certain conventional dimensional parts tolerances in manufacture.

It is a further object of the present invention to provide a novel method of manufacturing electric machines which simplifies the manufacturing processes yet results in a machine of greatly improved torque characteristics.

Other objects of the present invention include the provision of a novel construction which permits the mass production of rotating electric machines of improved torque characteristics and the provision of a unique method of assembly whereby the air gap length is minimized and construction is simplified.

Other objects of the present invention will become well understood from a study of the following description, in conjunction with the attached drawings, throughout which like numerals refer to like parts:

2

Figure 1:
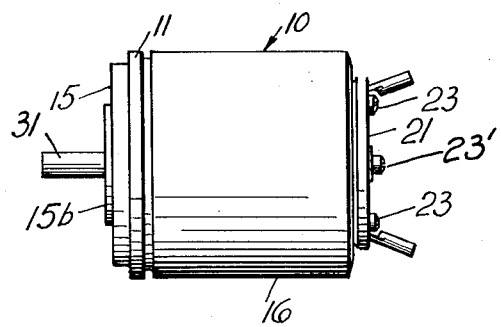
Fig. 1 is an elevational view of a motor made in accordance with the present invention.
Figure 3:
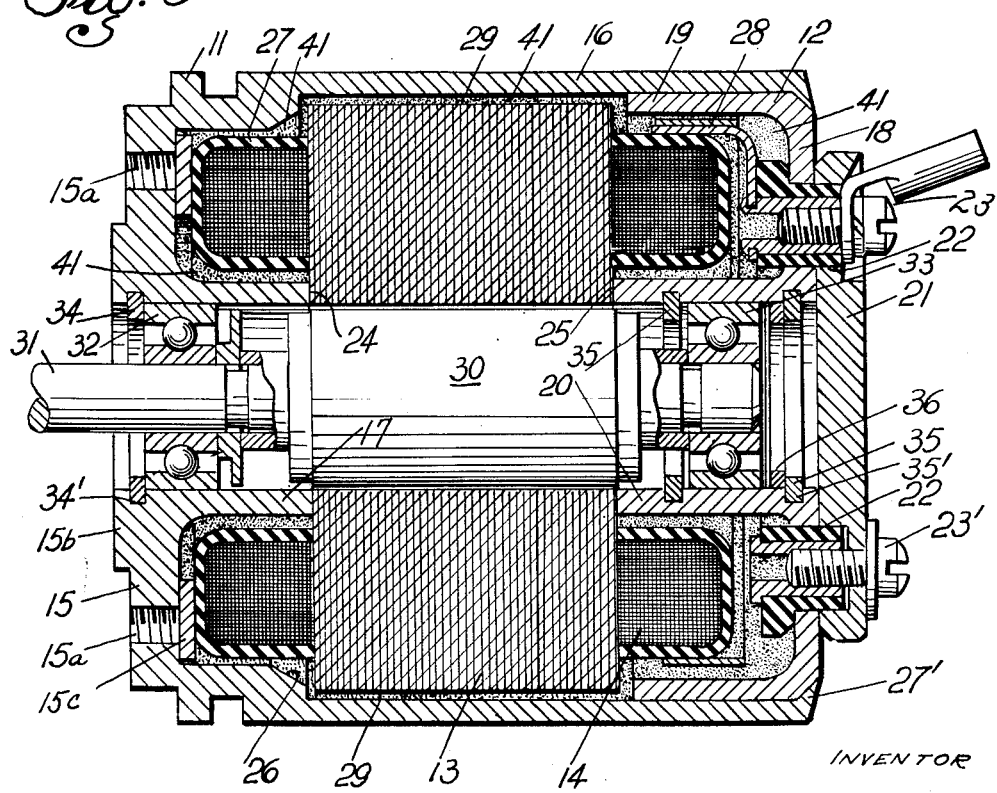
Fig. 3 is a longitudinal sectional view taken along the line 3—3 of Fig. 2.
Figure 2:
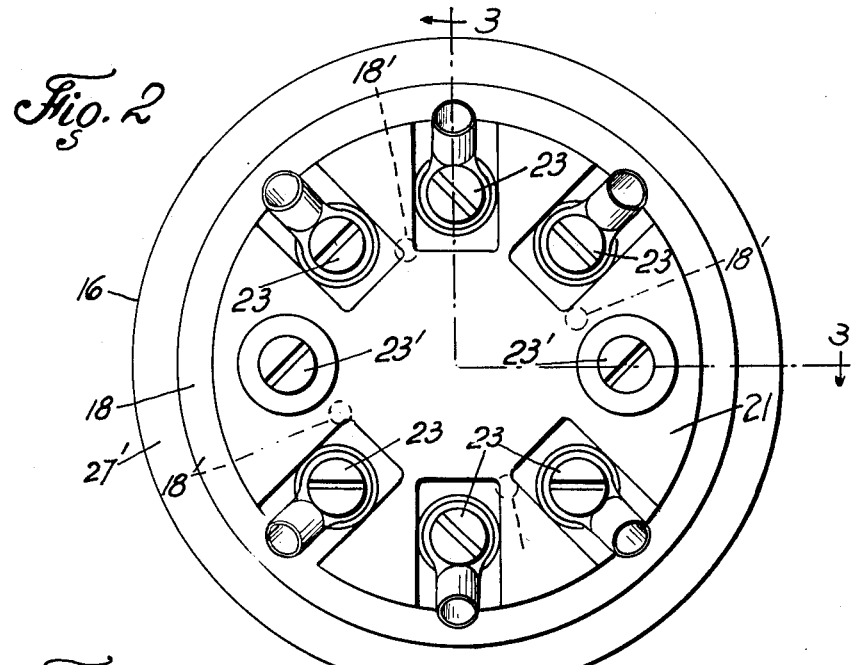
Fig. 2 is an enlarged end elevational view of the motor.
Figure 4:
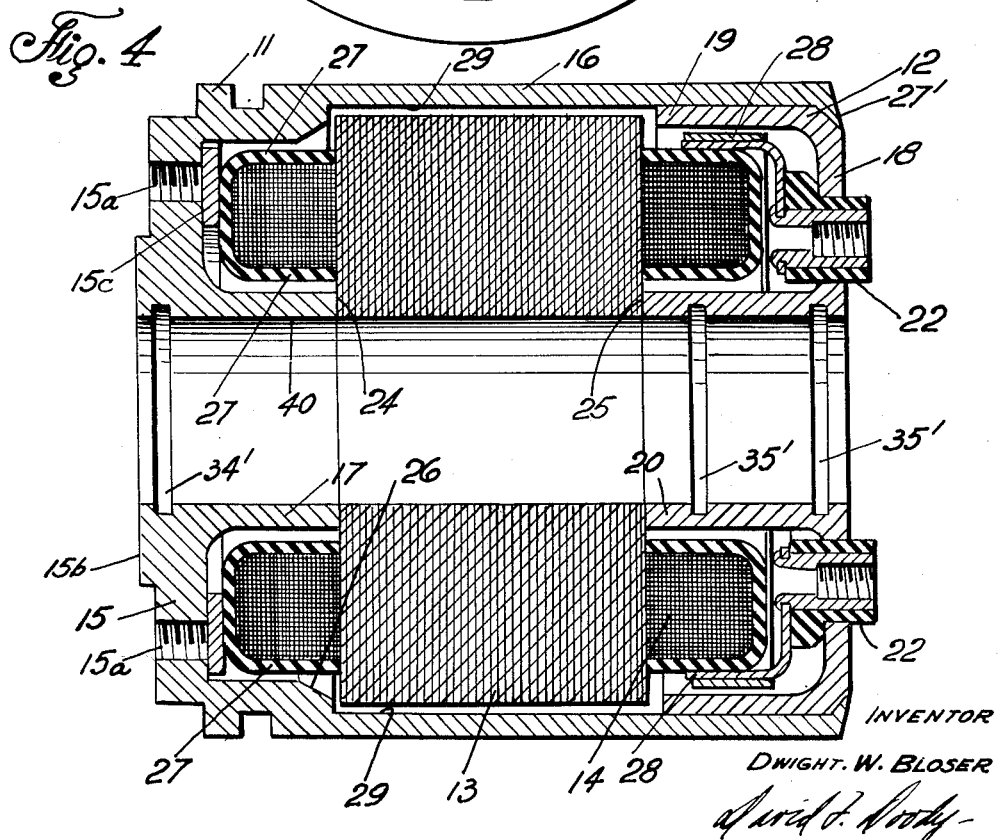
Fig. 4 is a longitudinal sectional view of the motor with end plate and rotor removed.

Having reference particularly to Fig. 3, 10 represents a motor having two main housing sections, 11 and 12. The stator includes a stack of iron laminations 13 and windings 14 distributed through the lamination stack in the conventional manner. Housing section 11 is generally cup shaped having an end plate 15 and an integral cylindrical portion 16. End plate 15 has tapped holes 15a and a pilot flange 15b for mounting the motor to a wall or bulkhead. End plate 15 also merges into an internally extending hub portion 17. A metal ring 15c is spotwelded within end plate 15 and protects the machine windings from being damaged. Housing section 12 includes an end plate 18 and a cylindrical portion 19 interfitting with portion 16 of section 11. Section 12 also has a cylindrical hub portion 20 extending inwardly of end plate portion 18. Housing sections 11 and 12 are secured together by the spun-over lip 27' of section 11.

End plate 18 encloses an insulating bushing ring 22 into which are screwed electrical connectors 23 and cover plate bolts 23' extending through cover plate 21. Hub portions 17 and 20 terminate inwardly in radial, annular faces 24 and 25 respectively. Housing section 11 has formed therein a shoulder 26. It will be noticed that shoulder 26 lies to the left (Fig. 3) of the plane containing annular face 24. Likewise, it will be noticed that cylindrical portion 19 of housing section 12 terminates in a radial plane to the right of the plane containing annular face 25. These annular faces 24 and 25 butt against the end laminations of stack 13 and keep them rigidly in position when the two housing sections 11 and 12 are fitted together and retained in place by the lip 27'.

Windings 14 are covered by a protective paper covering 27, which may be of flat stock or preshaped to fit over windings 14. Electrical connections are brought out through covering 27 to connect winding 14 and connectors 23 by means of leads 28. Stator laminations 13 have an outside diameter smaller, by about .004", than the internal diameter of portion 16 of the housing 11, leaving an annular space 29 between the housing 16 and the laminations 13. This annular space is exaggerated in the drawings for clarity.

Rotor 30, which may be of conventional construction, is carried on a shaft 31 through ball bearing sets 32 and 33 mounted respectively within the bores of hub portions 17 and 20. Rotor 30 is retained in place axially by the snap rings 34 and 35 mounted in grooves 34' and 35'. Shims

What is claimed is:

1. A dynamo-electric machine comprising a housing containing a stator and a rotor, said housing having a longitudinally extending generally cylindrical portion terminating at each end in inwardly extending radial hub members, said stator being spaced from the longitudinally extending housing portion, bearing members mounted in axial alignment within said radially extending portions, said rotor being mounted within said bearing members and having a central shaft extending outside said housing, said stator including a stack of laminations of magnetic material and a distributed winding, said hub members extending axially inwardly and being in close contact with the end laminations of said stack and forming with said longitudinally extending portion a closed chamber, a coverplate attached to one of said radially extending housing sections, said coverplate having electrical terminals mounted thereon, electrical leads extending between said winding and said terminals and an envelope of solid impregnating compound between said housing and said stator and completely filling said chamber and supporting said stator within said housing.

2. A dynamo-electric machine comprising a housing containing a stator and a rotor, said housing having a longitudinally extending generally cylindrical portion terminating in inwardly extending radial hub portions, said stator being spaced from the longitudinally extending housing portion, bearing members mounted in axial alignment within said radially extending hub portions, said rotor being mounted within said bearing members and having a central shaft extending outside said housing, said stator including a stack of laminations of magnetic material having a centrally located rotor receiving bore and a distributed winding, said hub portions and said centrally located bore having the same diameter, a coverplate attached to one of said radially extending housing sections, said coverplate having electrical terminals mounted thereon, electrical leads extending between said winding and said terminals and an envelope of solid impregnating compound between said housing and said stator throughout said longitudinally extending portion of said housing and within said inwardly extending hub portions.

3. A dynamo-electric machine comprising a housing containing a rotor and a stator including a stack of laminations and a winding, said stack of laminations having a central, rotor-receiving bore formed therein, said housing having an axially extending portion spaced from said stack of laminations and terminating in end sections having hub members with a rotor-receiving bore formed therein, said hub members extending axially inwardly and contacting the end laminations of said stator forming with said axially extending portion a closed chamber, bearing members mounted within said hub members in axial alignment and a rotor-carrying shaft mounted in said bearing members, and an envelope of solid impregnating compound within said closed chamber and extending between the interior of said housing and said stack of laminations and supporting said stack within said housing.

DWIGHT W. BLOSER.

References Cited in the file of this patent

UNITED STATES PATENTS

| Number | Name | Date |
|---|---|---|
| 1,425,308 | Woock et al. | Aug. 8, 1922 |
| 1,852,829 | Welch | Apr. 5, 1932 |
| 2,107,481 | Johnson | Feb. 8, 1938 |
| 2,123,933 | Cotterman | July 19, 1938 |
| 2,311,805 | Yost | Feb. 23, 1943 |
| 2,329,151 | Brady | Sept. 7, 1943 |
| 2,423,345 | Roters | July 1, 1947 |
| 2,483,024 | Roters | Sept. 27, 1949 |
| 2,485,408 | Pezzillo | Oct. 18, 1949 |

FOREIGN PATENTS

| Number | Country | Date |
|---|---|---|
| 137,089 | Great Britain | Dec. 22, 1919 |